United States Patent
Lin

(10) Patent No.: US 9,116,312 B2
(45) Date of Patent: Aug. 25, 2015

(54) LENS ELEMENT AND OPTICAL COMMUNICATION APPARATUS WITH SAME

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 105 days.

(21) Appl. No.: 13/861,393

(22) Filed: Apr. 12, 2013

(65) Prior Publication Data

US 2014/0056564 A1   Feb. 27, 2014

(30) Foreign Application Priority Data

Aug. 21, 2012   (TW) .............................. 101130208 A

(51) Int. Cl.
    *G02B 6/43*    (2006.01)
    *G02B 6/42*    (2006.01)

(52) U.S. Cl.
    CPC .............. *G02B 6/4204* (2013.01); *G02B 6/423* (2013.01); *G02B 6/4214* (2013.01); *G02B 6/4244* (2013.01); *G02B 6/4246* (2013.01); *G02B 6/428* (2013.01); *G02B 6/4243* (2013.01)

(58) Field of Classification Search
    None
    See application file for complete search history.

(56) References Cited

U.S. PATENT DOCUMENTS

| | | | | |
|---|---|---|---|---|
| 5,485,538 | A * | 1/1996 | Bowen et al. | 385/92 |
| 6,636,540 | B2 * | 10/2003 | Uebbing | 372/36 |
| 6,888,988 | B2 * | 5/2005 | Vancoille et al. | 385/47 |
| 6,895,147 | B2 * | 5/2005 | Posamentier | 385/47 |
| 6,939,058 | B2 * | 9/2005 | Gurevich et al. | 385/93 |
| 7,165,896 | B2 * | 1/2007 | Hauffe et al. | 385/88 |
| 8,000,358 | B2 * | 8/2011 | Wang | 372/29.011 |
| 2012/0193522 | A1 * | 8/2012 | Yan et al. | 250/227.28 |
| 2012/0219256 | A1 * | 8/2012 | McColloch | 385/88 |
| 2012/0263416 | A1 * | 10/2012 | Morioka | 385/33 |
| 2014/0314422 | A1 * | 10/2014 | Shao et al. | 398/138 |

FOREIGN PATENT DOCUMENTS

| | | | | |
|---|---|---|---|---|
| JP | 2006-344915 A | * | 12/2006 | H01S 5/022 |
| WO | WO 2011/077723 A1 | * | 6/2011 | G02B 6/42 |

* cited by examiner

*Primary Examiner* — Mike Stahl
(74) *Attorney, Agent, or Firm* — Novak Druce Connolly Bove + Quigg LLP

(57) ABSTRACT

A lens element includes a main body and a light splitting member. The main body includes an end surface allowing optical fibers to optically connect to the main body, and a bottom surface facing toward optical signal emitting/receiving elements. The main body defines a groove. The groove includes a reflecting surface for reflecting optical signals between the optical signal emitting/receiving elements and the optical fibers. The light splitting member is positioned in a path of light emitted by the optical signal emitting/receiving elements, the light splitting member splits the light into two split light beams, and directs one of the split light beams to the optical fibers and directs the other of the split light beams to an optical detector.

12 Claims, 4 Drawing Sheets

LENS ELEMENT AND OPTICAL COMMUNICATION APPARATUS WITH SAME

BACKGROUND

1. Technical Field

The present disclosure relates to lens elements and optical communication apparatuses and, particularly, to an optical lens and optical communication apparatus with optical signal feedback function.

2. Description of Related Art

Optical communication apparatus generally include an emitter for emitting light, an optical fiber for transmitting the light, and a lens element for optically coupling the light between the emitter and the optical fiber. In typical optical communication apparatuses, the light from the emitter is directly sent to the optical fiber and therefore cannot be measured for intensity and stability. As such, communication quality may be adversely affected when the light does not qualify and cannot be detected.

What is needed therefore is a lens element and an optical communication apparatus with the lens element addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
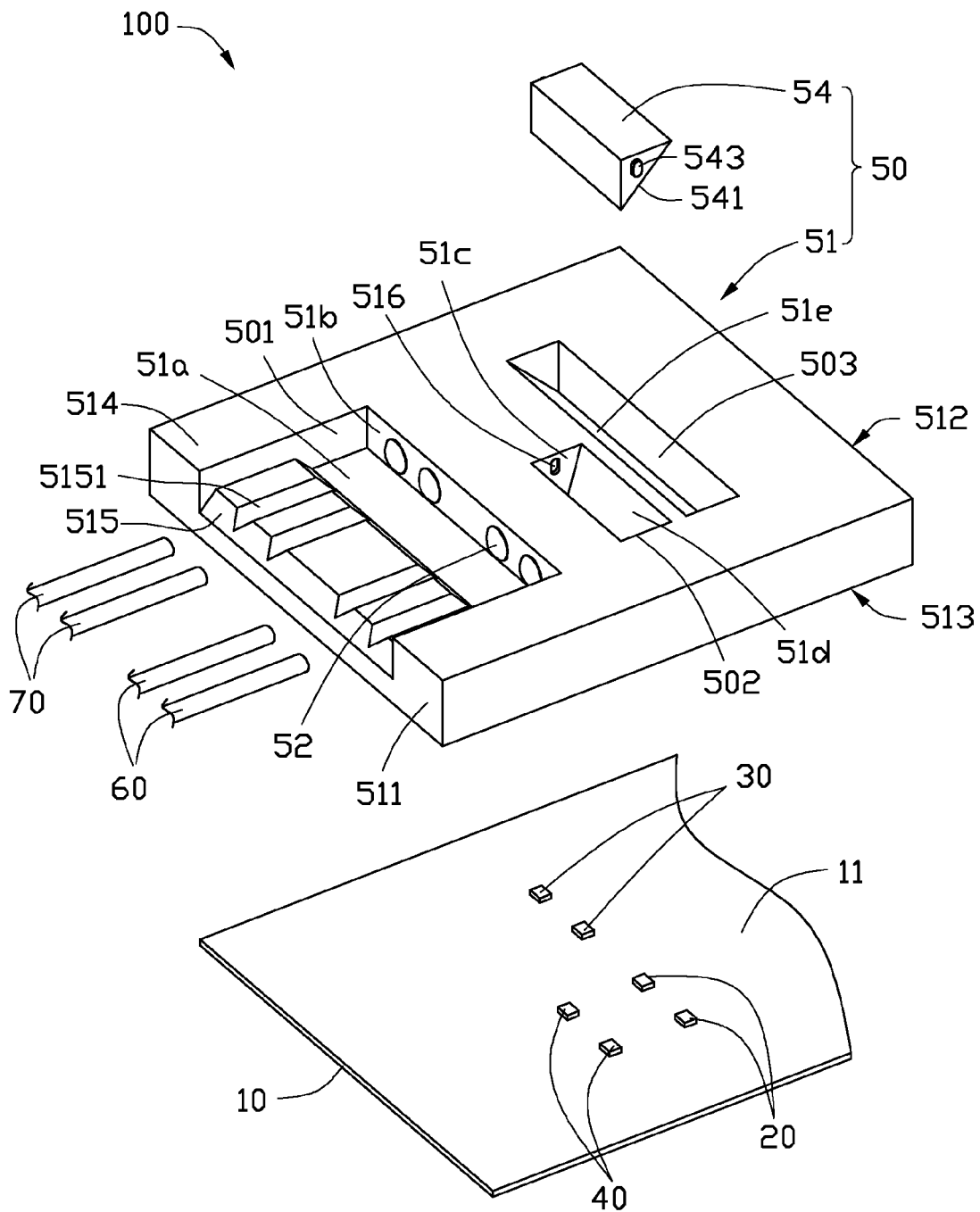
FIG. 1 is an exploded view of an optical communication apparatus, according to an exemplary embodiment of the present disclosure, wherein the optical communication apparatus includes a lens element.
Figure 2:
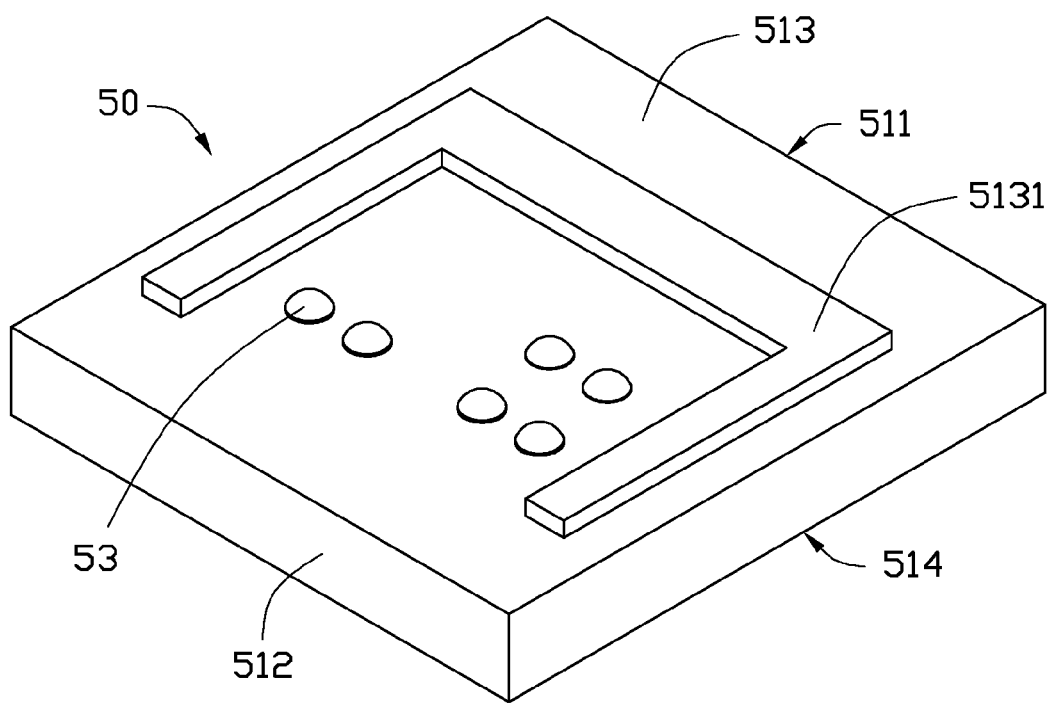
FIG. 2 is an isometric view of the lens element of the optical communication apparatus of FIG. 1, viewing from another angle different from FIG. 1.
Figure 3:
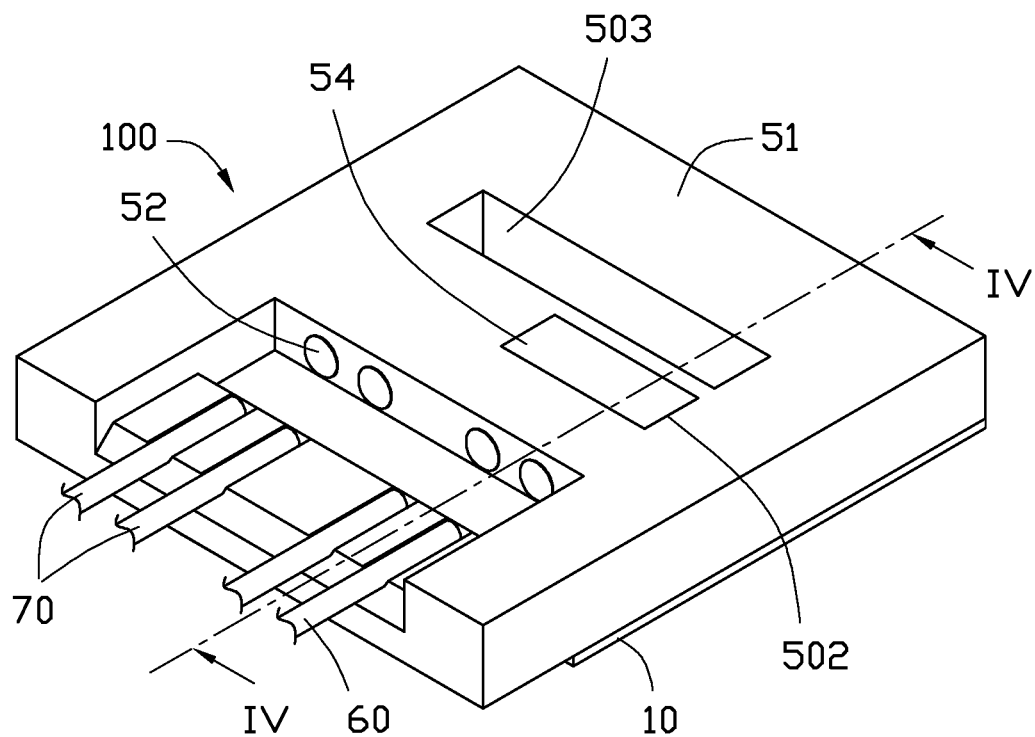
FIG. 3 is an assembled view of the optical apparatus of FIG. 1.
Figure 4:
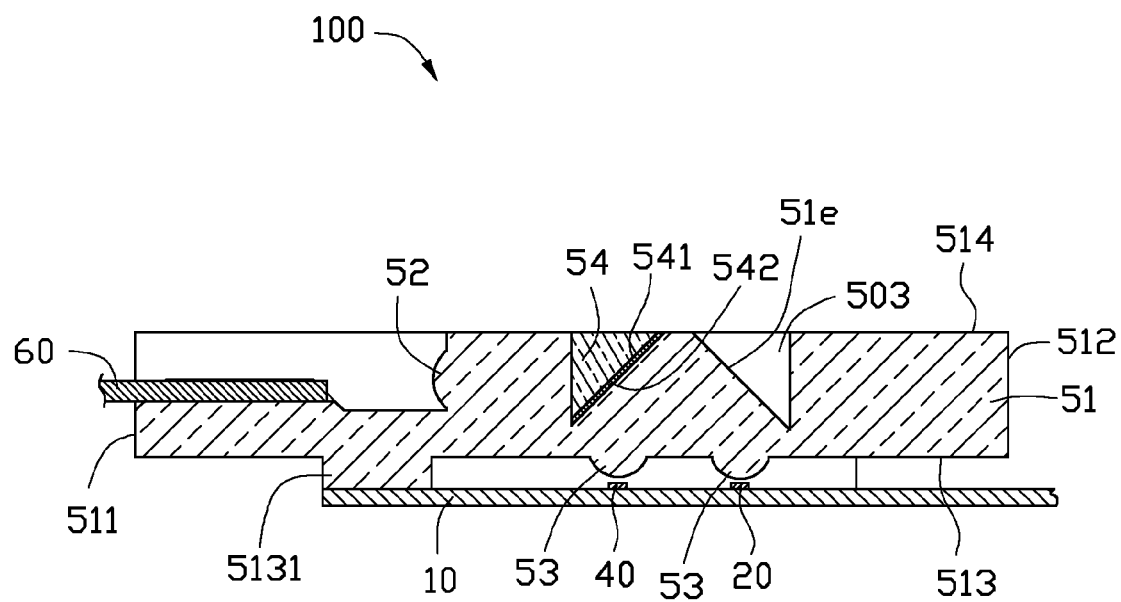
FIG. 4 is a cross-sectional view of the optical apparatus of FIG. 3, taken along line IV-IV.

FIGS. 1-4 show an optical communication apparatus 100 according to an exemplary embodiment. The optical communication apparatus 100 includes a printed circuit board (PCB) 10, two optical emitters 20, two optical receivers 30, two optical detectors 40 corresponding to the optical emitters 20, a lens element 50, two output optical fibers 60 corresponding to the optical emitters 20, and two input optical fibers 70 corresponding to the optical receivers 30.

The PCB 10 includes a mounting surface 11 for mounting the optical emitters 20, the optical receivers 30, and the optical detectors 40 thereon. The PCB 10 further includes one or more printed circuits (not shown) for transmitting electrical signals and providing electrical power for the optical emitters 20, the optical receivers 30, and the optical detectors 40.

The optical emitters 20, the optical receivers 30, and the optical detectors 40 are electrically connected to the PCB 10. The optical emitters 20 and the optical receivers 30 are arranged along a first linear direction, the optical detectors 40 are arranged along a second linear direction substantially parallel to the first linear direction, and each optical detector 40 is aligned with a corresponding optical emitter 20 along a direction substantially perpendicular to the first and second linear directions. The optical emitters 20 are configured for emitting light representing predetermined optical signals. The optical receivers 30 are configured for receiving light from the input optical fibers 70. Each of optical detectors 40 is configured for detecting the optical signals emitted from a corresponding optical emitter 20 and transmitting a detecting result to the corresponding optical emitter 20. The lens element 50 is positioned on the mounting surface 11 and covers the optical emitters 20, the optical receivers 30, and the optical detectors 40. The lens element 50 is configured for coupling optical signals between the optical emitters 20 and the output optical fibers 60, and coupling optical signals between the optical receivers 30 and the input optical fibers 70.

The lens element 50 includes a main body 51, a number of first lens portions 52, a number of second lens portions 53, and a light splitting member 54.

The main body 51 is substantially rectangular-shaped. The main body 51 includes a first end surface 511, a second end surface 512 opposite to the first end surface 511, a bottom surface 513, and a top surface 514 opposite to the bottom surface 513. The main body 51 defines a first groove 501, a second groove 502, and a third groove 503. The first groove 501 passes through the top surface 514 and the first end surface 511. The first groove 501 forms a first surface 51a and a second surface 51b in the main body 51. The first surface 51a is substantially parallel to the bottom surface 413, and the second surface 51b is substantially parallel to the first end surface 511. The main body 51 includes a protrusion 515 upwardly protruding from the first surface 51a. The protrusion 515 defines a number of positioning grooves 5151 for receiving both the input optical fibers 60 and the output optical fibers 70. The second groove 502 and the third groove 503 are defined in the top surface of the main body 51, and the second groove 502 is located between the first groove 501 and the third groove 503. The second groove 502 is positioned over the optical detectors 40 along the second linear direction. The length of the second groove 502 is not less than a distance between the optical detectors 40. The second groove 502 forms two opposite positioning surfaces 51c and a first inclined surface 51d connected between the positioning surfaces 51c. Each positioning surface 51c defines an engaging groove 516. The first inclined surface 51d is adjacent to the third groove 503, and an included angle between the first inclined surface 51d and the bottom surface 513 is substantial 45 degrees. The third groove 503 forms a second inclined surface 51e in the main body 51. The second inclined surface 51e is substantially perpendicular to the first inclined surface 51d. An included angle between the second inclined surface 51e and the bottom surface 513 is substantial 45 degrees. The main body 51 further includes a supporting portion 5131 protruding from the bottom surface 513.

The first lens portions 52 are formed on the second surface 51b, and each first lens portion 52 is optically aligned with a corresponding one of the output optical fibers 60 and the input optical fibers 70. The second lens portions 53 are formed on the bottom surface 513, and each second lens portion 53 is optically aligned with a corresponding one of the optical emitters 20, the optical receivers 30, and the optical detector 40. In this embodiment, the first lens portions 52 and the second lens portions 53 are convex lenses, and the first lens portions 52 and the second lens portions 53 are integrally formed with the main body 51. An optical axis of each first lens portion 52 is substantially parallel to the bottom surface 513, and an optical axis of each second lens portion 53 is substantially perpendicular to the bottom surface 513. The optical axis of each of the second lens portions 53 which are corresponding to the optical detectors 40 is intersected with the optical axis of a corresponding first lens portion 52 at the first inclined surface 51*d*. The optical axis of each of the second lens portions 52 which are corresponding to the optical emitters 20 is intersected with the optical axis of a corresponding first lens portion 53 at the second inclined surface 51*e*.

The light splitting member 54 is substantially shaped accommodating to a shape of the second groove 502. The light splitting member 54 includes a light splitting surface 541 and a light splitting film 542 coated on the light splitting surface 541. The light splitting film 542 reflects a portion incident light and allows the other portion of the light to pass therethrough. A ratio of the reflected light and the passing light can be adjusted by changing the material of the light splitting film 542 according to different requirements. The light splitting member 54 includes two engaging blocks 543 respectively protruding from two opposite ends of the light splitting member 54. The light splitting member 54 is received in the second groove 52, the light splitting surface 541 overlaps the first inclined surface 51*d*, and the engaging blocks 543 are engaged into the engaging grooves 516, respectively.

The main body 51 is positioned on the PCB 10 and covers the optical emitters 20, the optical receivers 30, and the optical detectors 40. The supporting portion 5131 supports the main body 51 on the PCB. The second lens portions 53 each optically aligned with a corresponding one of the optical emitters 20, the optical receivers 30, and the optical detector 40.

The output optical fibers 60 and the input optical fibers 70 are fixed in the corresponding positioning grooves 5151, and each of the output optical fibers 60 and the input optical fibers 70 is optically aligned with a corresponding one of the first lens portions 52.

In use, each optical emitter 20 converts electrical signals into corresponding optical signals and emits light representing the optical signals to a corresponding second lens portion 53; the second lens portion 53 converges the light into a substantially parallel light beam and directs the parallel light beam to the second inclined surface 51*e*. The second inclined surface 51*e* reflects the parallel light beam to the first inclined surface 51*d* and the light splitting member 54. The light splitting member 54 splits the light beam into two split light beams, one of the split light beams passes through the light splitting film 542 and reaches a corresponding first lens portion 52 and then transmits into a corresponding output optical fiber 60, and the other of the split light beam is reflected to a corresponding second lens portion 53, passes through the second lens portion 53, and then projects on a corresponding optical detector 40; the optical detector 40 receives the other split light beam, detects an intensity and stability of the light according to the other split light beam, and transmits a detecting result to the corresponding optical emitter 20; the corresponding optical emitter 10 adjusts the emitted light according to the detecting result. Therefore, parameters of the emitted light can be timely detected by the optical detector 40, and the performance of the optical communication apparatus 100 is ensured.

In the embodiment, the number of the optical emitters 20, the optical receivers 30, the optical detectors 40, the output optical fibers 60 or the input optical fibers 70 are two. Alternatively, the number of the optical emitters 20, the optical receivers 30, the optical detectors 40, the output optical fibers 60 or the input optical fibers 70 can be changed according to different requirements.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens element for optically coupling optical signals between optical signal emitting/receiving elements and optical fibers, comprising:
   a main body comprising a first end surface allowing the optical fibers to optically connect to the main body, and a bottom surface facing toward the optical signal emitting/receiving elements, the main body defining a first groove, the first groove comprising a reflecting surface in the main body for reflecting the optical signals between the optical signal emitting/receiving elements and the optical fibers; and
   a light splitting member positioned in a path of light emitted by the optical signal emitting element, the light splitting member splitting the light into two split light beams, and directing one of the split light beams to the optical fibers and directing the other of the split light beams to an optical detector.

2. The lens element of claim 1, wherein the main body comprises a plurality of first lens portions corresponding to the optical fibers and a plurality of second lens portions corresponding to the optical signal emitting/receiving elements, each first lens portion is optically aligned with a corresponding optical fiber, and each second lens portion is optically aligned with a corresponding optical signal emitting/receiving element.

3. The lens element of claim 2, wherein the main body comprises a second end surface opposite to the first end surface, and a top surface opposite to the bottom surface.

4. The lens element of claim 3, wherein the main body defines a second groove therein, the second groove passes through the top surface and the first end surface of the main body and forms a first surface and a second surface in the main body, the first surface is substantially parallel to the bottom surface, and the second surface is substantially parallel to the first end surface.

5. The lens element of claim 4, wherein the main body comprises a protrusion upwardly protruding from the first surface, and the protrusion defines a plurality of positioning grooves each for positioning an optical fiber therein.

6. The lens element of claim 4, wherein the main body defines a third groove between the first groove and the second groove, and the light splitting member is received in the third groove.

7. The lens element of claim 6, wherein the light splitting member comprises a light splitting surface and a light splitting film coated on the light splitting surface, the light splitting film reflects a portion of incident light and allows the other portion of the incident light to pass therethrough.

8. The lens element of claim 7, wherein the third groove forms two opposite positioning surfaces, and a first inclined surface connected between the positioning surfaces in the main body, each positioning surface defines an engaging groove therein, the light splitting member comprises two engaging blocks respectively protruding from two opposite ends of the light splitting member, the light splitting surface overlaps the first inclined surface, and each engaging block is engaged into a corresponding engaging groove.

9. An optical communication apparatus, comprising:
   an optical emitter;

an optical receiver;
an output optical fiber;
an input optical fiber;
an lens element optically connecting the output optical fiber to the optical emitter and optically connecting the input optical fiber to the optical receiver, the lens element comprising:
a main body comprising a first end surface allowing the output optical fiber and the input optical fiber to be optically connected therein, and a bottom surface facing toward the optical emitter and the optical receiver, the main body defining a groove, the groove comprising a reflecting surface for reflecting light from the optical emitter to the output optical fiber and from the input optical fiber to the optical receiver; and
a light splitting member positioned in a path of light emitted by the optical emitter, the light splitting member splitting the light into two split light beams, and directing one of the split light beams to the output optical fiber; and an optical detector, the light splitting member for directing the other of the split light beams to the optical detector, the optical detector for detecting the other of the split light beams and transmitting a detecting result to the optical emitter.

10. The lens element of claim 8, wherein an included angle between the first inclined surface and the top surface is 45 degrees, an included angle between the reflecting surface and the top surface is 45 degrees, an included angle between the first inclined surface and the reflecting surface is 90 degrees;
an included angle between the light splitting surface and the top surface is 45 degrees, an included angle between the light splitting surface and the reflecting surface is 90 degrees, the light splitting surface faces the first inclined surface.

11. The lens element of claim 10, wherein the light splitting film touches the first inclined surface.

12. The lens element of claim 10, wherein the first groove is separated from the second groove.

* * * * *